May 14, 1968 V. L. O'GARA ET AL 3,382,635
SECTIONAL BATH COMPARTMENT
Filed March 1, 1965 6 Sheets-Sheet 1

INVENTORS
V. LAWRENCE O'GARA
JAY S. ROSS
BY Warren T. Jessup
ATTORNEY

May 14, 1968 V. L. O'GARA ET AL 3,382,635
SECTIONAL BATH COMPARTMENT
Filed March 1, 1965 6 Sheets-Sheet 2

INVENTORS
V. LAWRENCE O'GARA
JAY S. ROSS
BY Warren T. Jessup
ATTORNEY

May 14, 1968  V. L. O'GARA ET AL  3,382,635
SECTIONAL BATH COMPARTMENT

Filed March 1, 1965  6 Sheets-Sheet 4

INVENTORS:
Venard Lawrence O'Gara
Jay S. Ross

By Smyth, Roston & Pavitt
Attorneys

May 14, 1968 V. L. O'GARA ET AL 3,382,635
SECTIONAL BATH COMPARTMENT
Filed March 1, 1965 6 Sheets-Sheet 5

INVENTORS:
Venard Lawrence O'Gara
Jay S. Ross

Attorneys

May 14, 1968 V. L. O'GARA ET AL 3,382,635

SECTIONAL BATH COMPARTMENT

Filed March 1, 1965 6 Sheets-Sheet 6

INVENTORS:
Venard Lawrence O'Gara
Jay S. Ross

Attorneys

3,382,635
Patented May 14, 1968

1

3,382,635
SECTIONAL BATH COMPARTMENT
Venard Lawrence O'Gara, Newport Beach, and Jay
S. Ross, Beverly Hills, Calif., assignors to Superior
Laminates, Inc., Los Angeles, Calif., a corporation of California
Continuation-in-part of application Ser. No. 401,522,
Oct. 5, 1964. This application Mar. 1, 1965, Ser.
No. 446,446
14 Claims. (Cl. 52—270)

---

ABSTRACT OF THE DISCLOSURE

This invention relates to a bathroom enclosure which is sectionalized. The sections are constructed to provide for a telescoping of the sections during shipment. The sections are provided with flanges of a particular consrtuc­so that resilient clips can be attached to the flanges to hold the sections in a fixed relationship to one another.

---

This invention relates in general to bath enclosures, but relates more specifically to a wall construction and the means for joining sections of a wall construction in order to provide a functionally successful and decorative wall which may be shipped in sections. This application is a continuation-in-part of our copending application Ser. No. 401,522 filed Oct. 5, 1964, now abandoned, entitled "Sectional Bath Compartment."

Although inexpensive metal shower units have been available for a considerable period of time, quality glass fiber reinforced plastic shower and tub assemblies in one piece units have only been available for a relatively short period of time. These units are made with the base of the shower and the side enclosure walls as one monolithic structure in order to avoid all possibility of leakage, and to avoid the need for caulking in joints in an effort to prevent leakage.

Because such structure is so superior to the use of individual plastic or ceramic tile, tubs as well as showers are now available with monolithic side walls attached. Thus, the unit is sent to the construction site, and after proper placement and attachment of plumbing, it is completely finished, ready for the room walls to be brought up into engagement with the edges of the enclosure.

However, such units are extremely bulky when packaged for shipment, and consume a great volume of space in relationship to the relatively low total weight. Hence, special rates apply for transporting of such bulky items in interstate commerce or by ship to foreign ports.

Therefore, it becomes desirable to produce the walls of such shower stalls and tubs in sections in order to nest the parts and thus secure greater weight-to-volume ratio. However, making the walls in sections returns the walls to a composite construction, which is precisely the structure which is normally inferior and the motivating factor in making the unitary monolithic structure originally.

Therefore, it is an object of this invention to provide a sectional bath enclosure having an improved joint structure providing essentially the waterproof nature of a monolithic wall structure.

Attempts have been made to solve the composite structure problem to which this invention is directed, by pro-

2 viding vertical sections united in corner areas with overlapping portions to prevent leakage. Such junctures are difficult to hold in tight relationship, and eventually collect foreign matter which stagnates to produce both sanitary problems and odors. However, horizontal sections have been avoided because such horizontal sections produce unwanted seams that reduce the aesthetic value of the installations and calls attention to the panel nature of the wall.

Accordingly, it is an object of this invention to provide a wall panel construction which accentuates a horizontal abutment line and creates an enhancement of the design by making the horizontal abutment line an attractive part of the overall design.

For a full understanding of the invention, a detailed description of the preferred embodiment of the sectional bath enclosure will now be given in conjunction with the accompanying drawings:

FIGS. 1–9 illustrate the principles of the invention as applied to a stall shower 10. However, these same principles will be applicable to the building of similar type structures including a full bathtub and wainscote wall.

Figures 1, 2, 3:
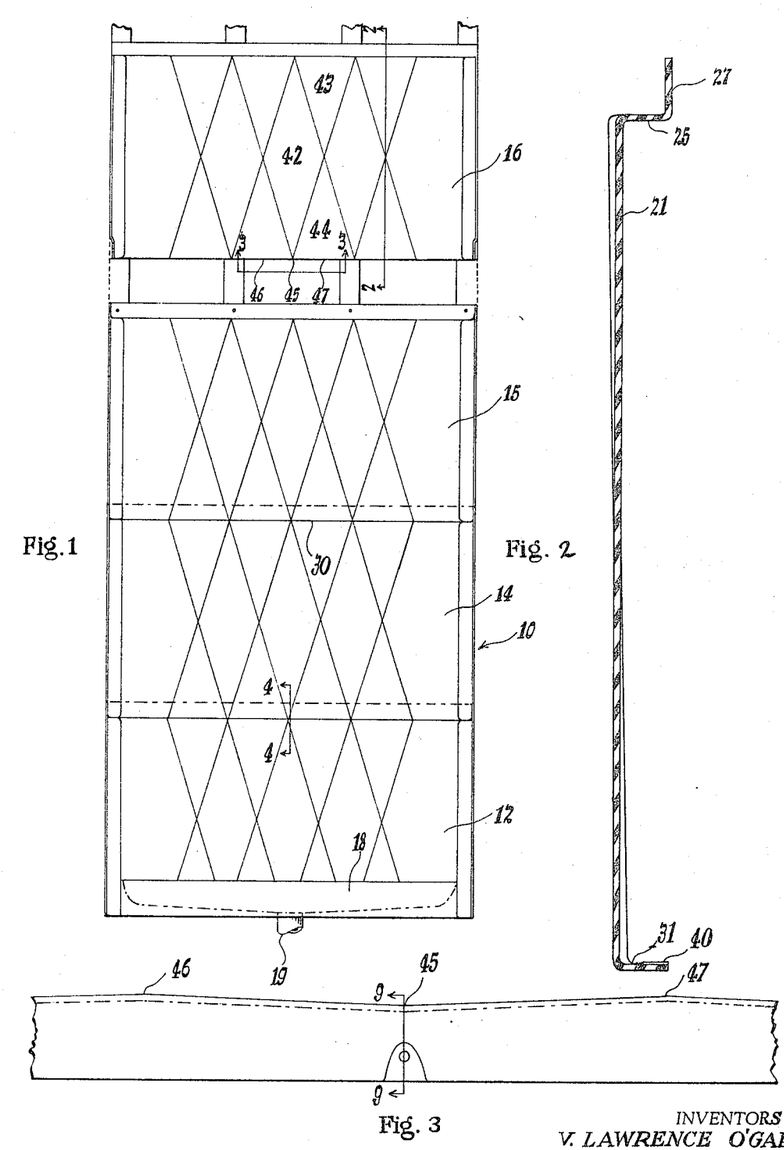
FIG. 1 is a front elevation of a shower stall embodying the principles of this invention, as it appears in the process of assembly and installation.
FIG. 2 is a section taken long the line 2—2 of FIG. 1.
FIG. 3 is an end view of a portion of a panel of FIG. 1, as taken along the line 3—3 of FIG. 1.

In FIG. 1 of the drawings the view is from the front opening of a stall shower as it is being installed. Either a door or a curtain will be fitted to the shower when in actual use.

The stall shower 10 includes a base section 12 and three wall sections 14, 15 and 16.

Figure 4:
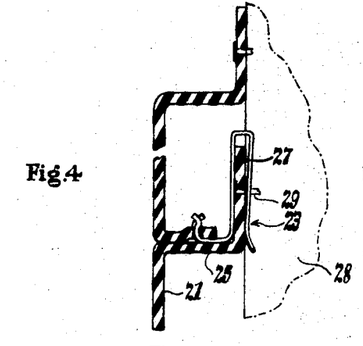
FIG. 4 is a section taken along the line 4—4 of FIG. 1.
Figure 5:
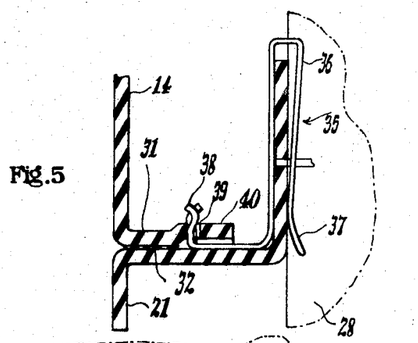
FIG. 5 is an enlarged section taken from FIG. 4, with a modification in the form of a sealing gasket.

The base section 12 includes a pan 18 with a drain outlet 19. Base section 12 has a side wall 21. FIGS. 4 and 5 will aid in understanding the construction of side wall 21. Wall 21 is preferably integral with the pan 18, and has a top ledge 23 which is common in form to the top ledge sections of the three wall sections. The top ledge 23 includes a lateral portion 25 and a vertical portion 37. The vertical portion serves the purpose of a nailing flange and abuts the supporting framing structure. A portion of the supporting framing structure is indicated by the reference character 28. A nail 29 is shown driven through the vertical portion 27 and into the framing member 28. Thus, the section, whether it be the base section or a wall section, is secured to the frame and the wall is spaced from the frame.

The purpose for the lateral portion 25 is to provide for the novel feature of enabling a waterproof joint without the necessity of elaborate caulking precautions. Each of the wall sections has a base sill 31 which sits upon the lateral portion 25 of the member therebelow, whether it is the base section 12 or a lower wall section. The FIG. 4 illustrates the junction thus formed in either case, and is indicated by reference character 30. It is a lateral division line which extends across the enclosure. If water from a shower head, or otherwise, is driven with great force against the resultant division line of junction 30, it is conceivably possible that some will work back into the junction beyond the seat portion. This is a relatively remote possibility, because generally the bottom of the sill is smooth and will form a good seat with the ledge. However, imperfections can provide water access in some instances. If in fact an imperfect joint is formed and water is directed in such manner that it is possible to work past the joint, the water will not be able to go beyond the immediate area of the junction because the vertical portion 27 provides a deep well to hold a considerable amount of such water. Thus, if the junction does take in water, it will remain in this well and gradually work back into the enclosure.

In order to give further assurance against any leaking whatsoever, a gasket 32, in the form of a flat strip of resilient material, or possibly a pre-positioned ribbon of caulking material, may be placed on the ledge and be engaged by the sill in order to seal against any small leakage opening. In either event, the improved joint structure of this invention makes absolutely impervious the union between the wall sections, in order to prevent deterioration behind the walls.

The wall sections are relatively thin, glass reinforced plastic as a preferable construction, and in order to avoid massive sections or extra expense, they need not normally be reinforced for great physical strength. Thus, it is reasonable to assume that under ordinary manufacturing techniques the registration of the wall sections will not normally be perfect, and furthermore, unless special support provisions were made, any pressure on the wall would permit the wall in the junction area of the sill to move with respect to the ledge of the supporting structure below.

To prevent relative movement, without penetrating the walls with nails, an improved clip construction 35 is employed to register the wall sections and hold them in such registration. Clip 35 has a C section 36 which is designed to clip down over the top of vertical portion 27. It is then provided with a lip 37 in order to enable the C section to find the edge of the vertical portion and slip down upon the section without exact initial registration. Furthermore, the clip 35 extends to a split prong section 38. The sill 31 is provided with a hole 39 to receive the split prong 38. Thus, the hole 39 may be located by a jig to establish the correct distance between the hole 39 and the vertical wall of the wall section, and the prong 38 is positioned to establish a gauge distance from the vertical portion 27 of the ledge. Thus, the wall of the upper section is positioned exactly with respect to the wall below.

Figure 7:
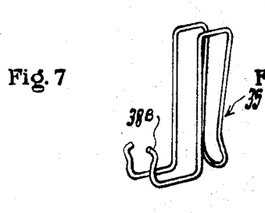
FIG. 7 is a perspective view of one embodiment of a spring retainer clip.
Figure 8:
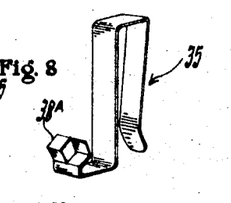
FIG. 8 is a second embodiment of a spring retainer clip.
Figure 9:
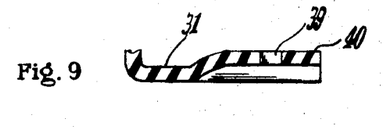
FIG. 9 is a section taken along line 9—9 of FIG. 3.

Refer to FIGS. 7 and 8 for illustrations of two types of clips 35. The FIG. 7 shows a flat spring steel embodiment wherein the prong 38a is split and the two halves are formed in opposite directions to present a resilient detent end. This end is engageable through a properly formed hole 39 and expandable to cause the clip to be secured to the sill.

In FIG. 7 a spring wire construction of like general form is provided, wherein the prong 38b is composed of two hook sections on the ends of the wires. These sections operate to hold the clip to the sill in the manner described with respect to FIG. 6.

When the wall sections are installed, the installer places the prong end 38 into the hole 39, and then lowers the wall section into position. In FIG. 1, the drawing is intended to depict the situation wherein the wall section is being lowered in such manner. When the workman installs the section, the wall section being installed will block his vision of the junction area, but by a reasonably careful alignment, the lip 37, of the clip 35 will find the upper edge of the vertical portion 27 and cause the described alignment. Thus, the installed section carries the clip into position. This clip is placed to fall between stud locations. In FIGS. 4 and 5, therefore, nail 29 appears to be located with the clip, but in reality lies beyond. The sill 31 is provided with a raised relief 40 in order to accommodate the physical dimensions of the clip 35.

The physical construction thus described provides a good and workable sectional bath enclosure which is entirely operative, but as thus far disclosed the problem of aesthetic qualities remains unsolved. The natural reaction to a series of joints in a structure such as a bath enclosure tends to greatly downgrade its acceptability. The purchaser preference is for a custom-installed structure which does not have the appearance of an afterthought or replacement unit. The diamond design configuration of this invention is used to accomplish this end, and yet provide a sectional member which can be shipped economically. The design configuration is employed to conceal the effect of the lateral joint, by adapting it as part of the design.

In FIG. 1, the wall structure is shown to have a diamond configuration wherein a complete diamond 42 extends from the top to the bottom of the individual wall section. Thus, there are produced resultant triangular half-diamond sections 43 and 44. Refer to wall section 16 for emphasis of this arrangement.

Refer then to FIG. 3, which is an enlarged partial end view of the wall section 16. This view illustrates the fact that the wall of the section 16 is not a flat wall, but rather that each of the triangular portions of the diamond configuration is alternately convex or concave, and in each instance, the opposite triangular section is of the opposite configuration. Triangular section 44 embodies the reference point 47. Note in FIG. 3 that the point 47 is convex as compared to an intermediate point 45 at the end of full diamond section 42. Reference 46 also is convex with respect to reference 45. Then, as previously indicated, the half-triangular section 43, being that opposite the section 44, will be convex, and if a section along this line were viewed, it would have the appearance of the reference 45.

The new result of this opposite convex and concave configuration is that the panels are greatly strengthened, but also at the junction of the two panels, the half diamond triangles will meet in a definite shoulder area which produces a shadow effect.

Figure 6:
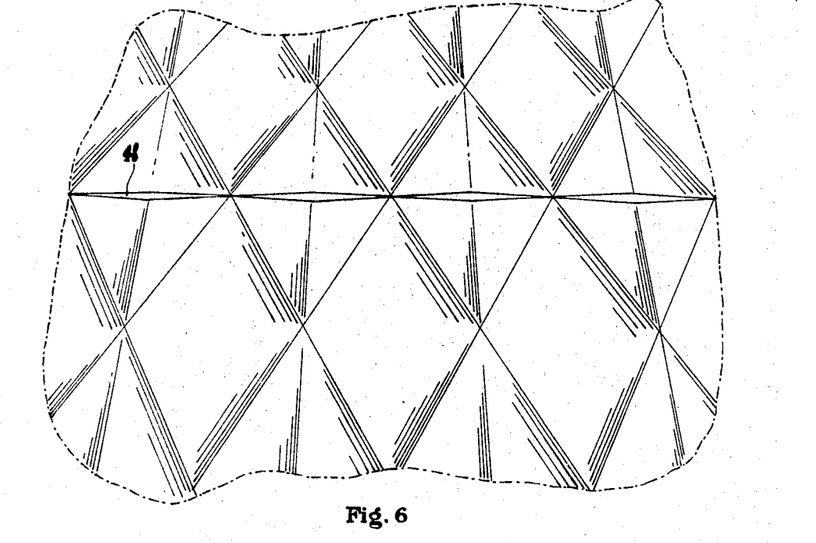
FIG. 6 is an oblique view of the assembled wall of the shower stall of FIG. 1 taken from a viewpoint substantially at the bottom center of the stall shower and looking upwardly along a wall.

Refer to FIG. 6 for an illustration of this emphasis of the union line. FIG. 6 is taken at an oblique angle, which may be likened to a perspective view. Thus, this view is from a viewpoint near the pan 18 looking upwardly along the back wall. From this viewpoint, it is seen that the sill of the wall panel produces a shoulder 48 which closes what would otherwise be an opening. The drawings illustrate with reasonable accuracy the physical construction, although the actual decorative effect of this construction can only be appreciated by actual use of the full size structure. The joint section is not noticed as a joint section, but appears to blend into an overall pattern of the wall as if an intended decorative feature. All awareness of sectional construction is lost, and the enclosure takes on the full elegance of a custom installed original piece of equipment.

The second embodiment of the invention shown in FIGS. 10 to 18 is a stall shower of the character described made in four separate sections comprising a bottom section 50, a second section 52 which is imposed on the first section, a third section 54 which is imposed on the second section and a fourth section 55 which is imposed on the third section. Each of the sections is a Fiberglas laminate formed by a well known method in which flock and a suitable binder are sprayed onto the outer surface of a male mold. The surface of the Fiberglas laminate that is the exposed inner surface in the assembled structure has a smooth gel coating that is formed by spraying the surface of the mold with a pigmented polyester plastic before the Fiberglas panel is formed.

The outer surface of each section while it is on the male mold is coated by a spraying operation with a layer of urethane foam which becomes integral with the wall of the section and serves the dual purpose of making the section wall relatively stiff and at the same time serving as a sound-absorbing medium. Preferably the Fiberglas laminate is of a thickness of 1/8 to 5/32 of an inch and the added layer of urethane foam is of a thickness of 1/4 to 3/8 of an inch.

The bottom section 50 has a downwardly dished bottom wall 56 which is integral with two side walls 58 and a back wall 60. Preferably the bottom wall 56 is stiffened by offset radial bosses 62 separated by radial grooves 64 and for further stiffness and reinforcement a thick layer 65 of the urethane foam is bonded to the underside of the bottom wall as indicated in section in FIG. 13. A layer 65 of the urethane foam is also bonded to the side and back walls of the bottom section as well as to the side and back walls of the other sections. The bottom wall 56 drains to a central drain port 66 which is provided with the usual plumbing fixtures (not shown) when the shower stall is completed.

Figures 13, 14, 15:
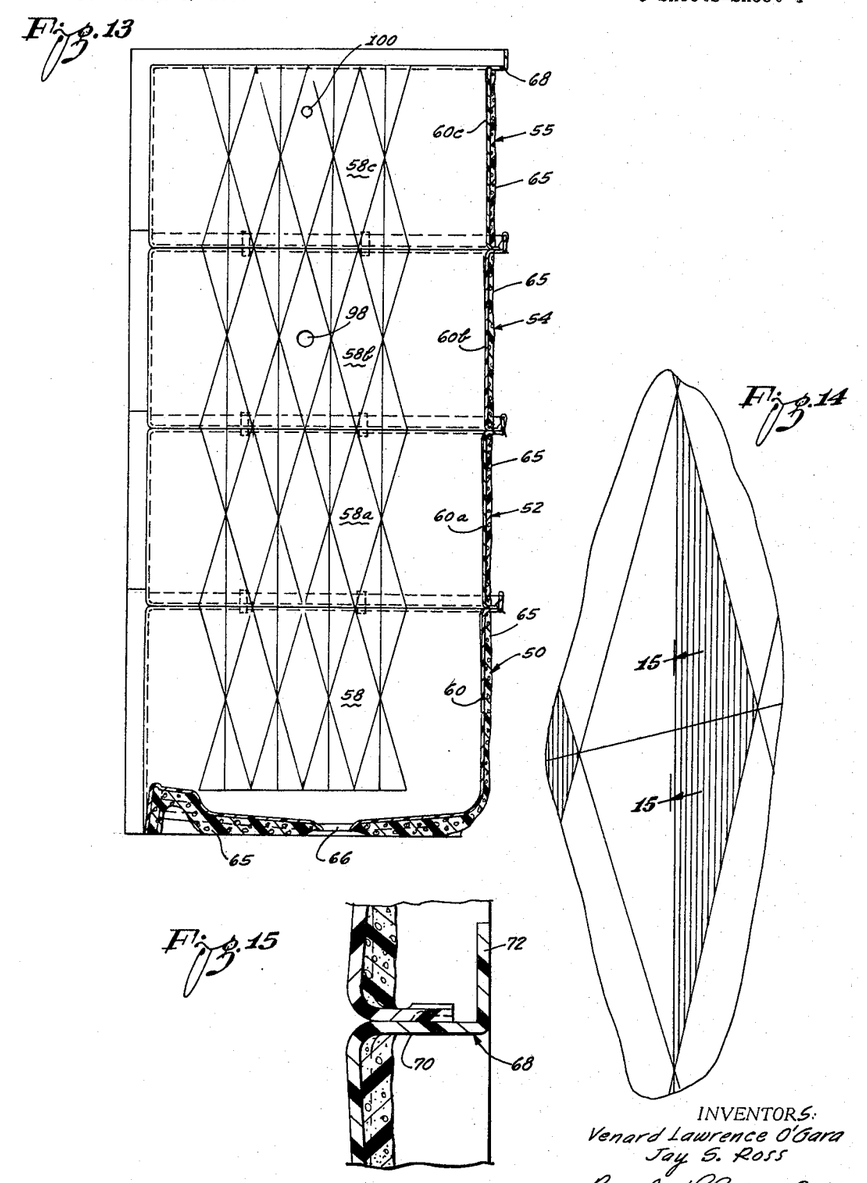
FIG. 13 is a vertical section of the assembled shower stall taken as indicated by the line and arrow 13 in FIG. 10.
FIG. 14 is an enlarged fragmentary perspective view of a portion of the structure shown in FIG. 13.
FIG. 15 is an enlarged section taken along the line 15—15 of FIG. 14.
Figure 16:
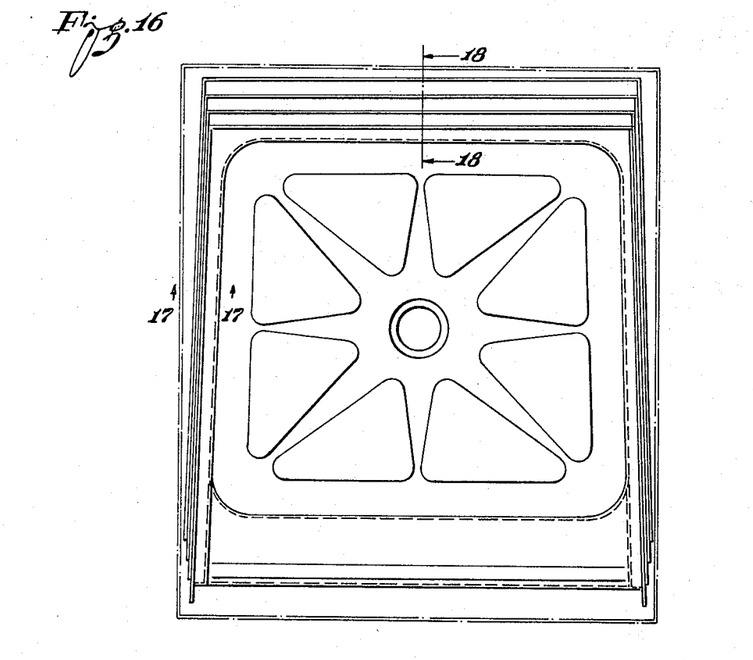
FIG. 16 is a plan view of the second embodiment of the invention in dismantled form which the sections nested together for transportation.

The upper rim of the bottom section, i.e. the upper edges of the two side walls 58 and the back wall 60 are formed with what may be termed an angular flange, generally designated 68, which, as best shown in FIG. 15, has a ledge portion 70 with a terminal lip portion 72. This angular flange 68 is continued along the forward vertical edges of the two side walls 58.

The second section 52 of the stall structure has two side walls 58a and a back wall 60a, the third section 54 has two side walls 58b and a back wall 60b, and the fourth section has two side walls 58c and a back wall 60c.

Each of the three upper sections 52, 54 and 55, like the bottom section 50 has an angular flange 68 around its top edge comprising the upper edges of its back wall and two side walls and this angular flange is continued along the forward vertical edges of the two side walls of each of the sections.

Figure 10:
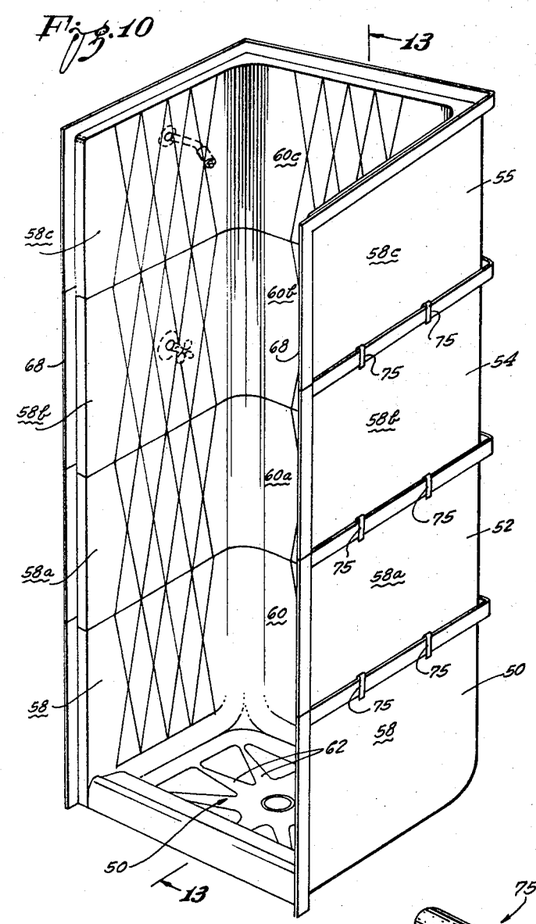
FIG. 10 is a perspective view of a second embodiment of the invention in assembled form.

The bottom rim of each of the three upper sections 52, 54 and 55 is provided with a simple outwardly turned right angular flange 74 extending around the lower edges of its back wall and two side walls. Thus when the four sections are assembled as shown in FIGS. 10 and 13 a bottom flange 74 nests into an angular flange 68 with the bottom flange resting on the ledge portion 70 of the angular flange.

In the general manner heretofore described, a plurality of spring retainers or clips 75 are employed at each of the horizontal joints between the sections of the assembled stall structure. Preferably each of the spring clips 75 is made of spring metal and is of the construction shown in FIG. 12.

Each clip 75 has the usual rearward arm 76 and a forward arm 78. The forward arm 78 is slit and bent to form a lower metal finger 80 and an upper pair of fingers 82. The lower finger 80 is offset to form an upwardly projecting dimple or boss 84. In the manner heretofore described, each of the lower right angular flanges 74 of the upper sections of the stall structure has locally offset portions 85 (FIG. 11) at selected points to provide clearance for the lower fingers 80 of the spring clips 75. A feature of this second embodiment of the invention is that each of the offset portions 85 is formed with a recess 86 on its underside which is dimensioned and positioned to receive the dimple or boss 84 of the corresponding clip 75 for positive engagement with the clip. Since the recess 86 may be formed by the molding operation, the provision of the recess instead of a bore saves an operation to reduce cost.

The procedure of assemblying and installing the stall structure may be as follows: First the bottom section 50 is installed and the lip portion 72 of the angular flange 68 along the top rim of the section and along the two vertical edges of the section is nailed to the vertical studs 88 of the building wall structure in the manner indicated in FIG. 11 which shows a nail 90 extending through the lip portion 72 of an angular flange 68 into a stud 92. A suitable permanently resilient sealant 94 (FIG. 11) is then placed on the ledge portion 70 of the flange 68, the applied sealant being continuous around the top rim of the bottom section and along the two forward vertical edges of the bottom section. The clips 75 are then slipped over the lip portion 72 of the angular flange at each of the predetermined points to cooperate with the offset portions 85 of the lower flange 74 of the next section 52. The next section 52 is then placed in its assembled position by forcing the bottom flange of the section 52 into engagement with the fingers of the clip 75 with the boss 84 of each spring clip engaging the corresponding recess 86 in the bottom flange 74 and then the lip portion 72 of the section is nailed to the studding. In the same manner a third section 54 is added to the second section and finally the fourth section 55 is added to the third section.

Figure 11:
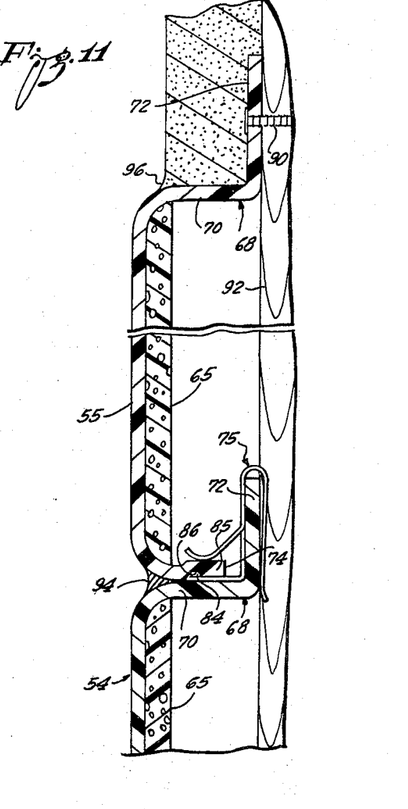
FIG. 11 is an enlarged fragmentary section along the vertical plane indicated by the vertical line and arrow 11 in FIG. 10.
Figure 12:
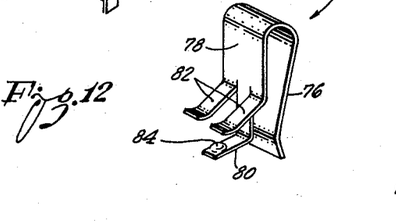
FIG. 12 is a perspective view of a clip that is used at each juncture of two of the sections of the second embodiment of the invention.

When the interior walls of the building structure are plastered, the plaster mates with the assembled stall structure in the manner shown in FIG. 11. It can be seen in FIG. 11 that the plaster 95 overlaps the lip portion 72 of the angular flange 68 and abuts the ledge portion 70, the plaster being formed with fillet 96 to make a pleasing transition at the shoulder of the ledge portion 70. If the interior walls of the building are surfaced with sheet material such as wallboard, the sheet material is nested into the angular flange 68 in the same manner.

To accommodate plumbing fixtures suitable apertures may be provided in the assembly at various points. For example, FIG. 13 shows an aperture 98 in a side wall of the section 54 and an aperture 100 in a side wall of the section 55 to accommodate plumbing fixtures shown in FIG. 10 comprising a valve 102 and a shower head 104 respectively.

Figure 17:
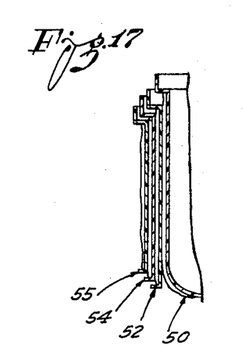
FIG. 17 is a sectional view taken along the line 17—17 of FIG. 16.
Figure 18:
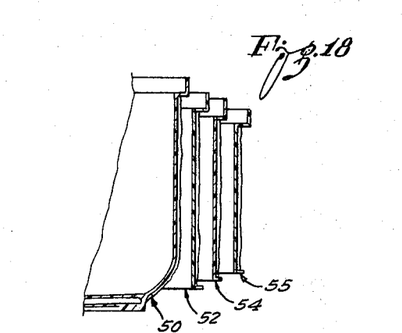
FIG. 18 is a section taken along the line 18—18 of FIG. 16.

An important feature of the second embodiment of the invention is the manner in which the four sections of the bath enclosure may be nested together compactly for economical storage and shipment. For this purpose each of the four sections is tapered in plan with the width of the section at the back wall of the section of shorter dimension than the width of the front open end of the section. For example, each section may be narrower at its back wall by one inch than at its front open end. Also for the purpose of enabling the sections to nest together compactly the section 50 is of greater vertical dimension than the next section 52, the next section 52 is greater in vertical dimension, say by ¾ of an inch than the section 54 and the section 54 is greater in vertical dimension, say by ¾ of an inch than the uppermost section 55. With respect to the manner in which the separate sections may be compactly assembled for storage it is to be noted that each of the three upper sections 52, 54 and 55 forms a channel extending around its sides and back, one side wall of the channel being the angular flange 68 of the section and the other side wall of the chamber being the lower flange or sill 74 of the section. In the compact assembly shown in FIGS. 16–18, the outermost section 55 embraces section 54 in the channel thereof; section 54 embraces section 52 in the channel thereof; and section 52 embraces the base section 50 in the channel thereof. As indicated in FIG. 17 the side walls of the nested assembly are relatively close together but as shown in FIG. 18 the back walls of the various sections are spaced further apart. Such a nested assembly may be packed in a carton of approximately 24″ x 36″ x 42″.

The third embodiment of the invention is a bath stall of the character heretofore described that provides a bath tub. The structure shown in FIG. 19 comprises the usual four sections including a base section 105, a second section 106, a third section 107 and a fourth section 108.

Figures 19, 20, 21:
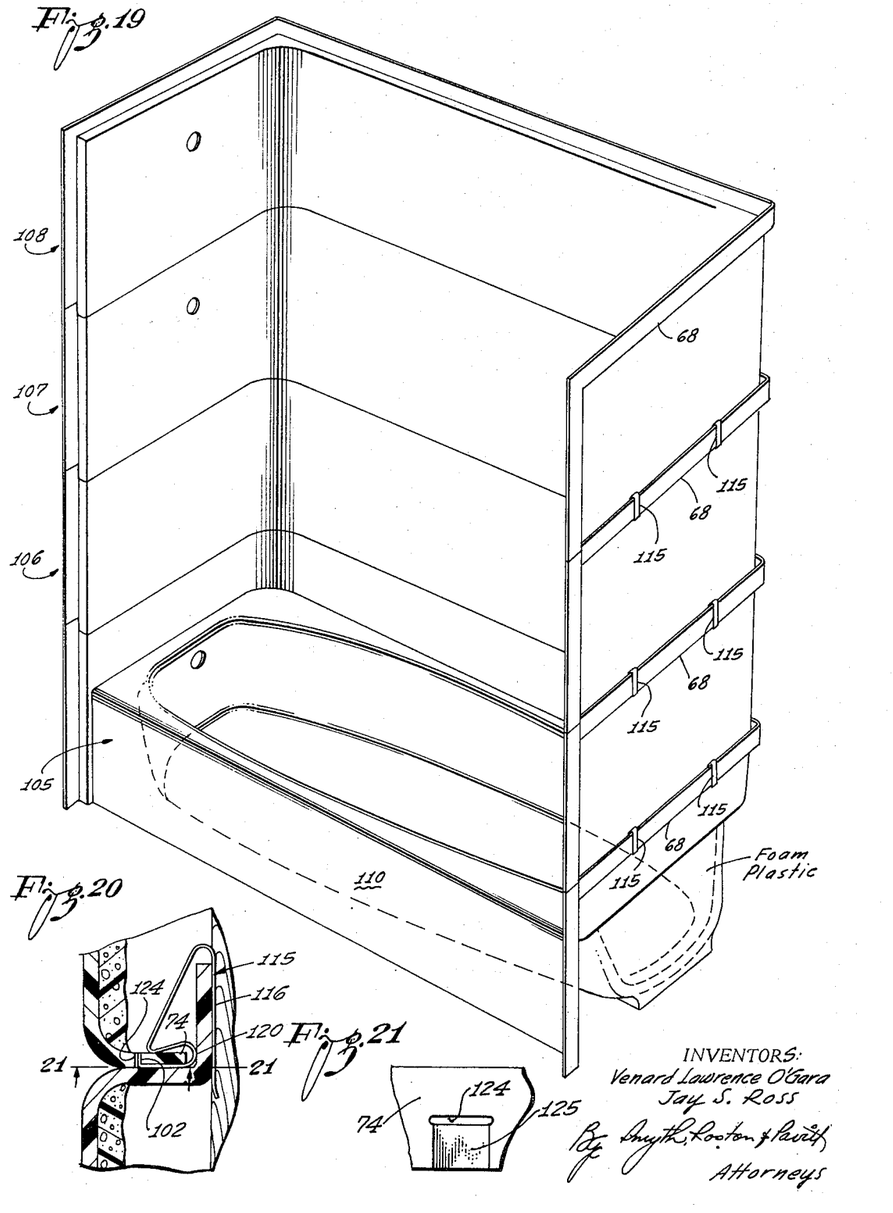
FIG. 19 is a perspective view of an embodiment of the invention in which the bottom section is a bath tub.
FIG. 20 is a fragmentary vertical sectional view showing how a retainer clip at a joint between two sections in FIG. 19 cooperate with the flanges of the two sections.
FIG. 21 is a bottom view of the flange of the upper section as seen along the line 21—21 of FIG. 2 showing how the flange is provided with a shallow recess on its underside that leads to a slot in the flange.

The base section 105 is in the form of a conventional bath tub that is provided with a forwardly spaced dependent front wall 110. In the manner heretofore described, each section is formed with an angular flange 68 that extends around the top rim of the section and also extends along the front vertical edges of the side walls of the section. As may be seen in FIG. 20, each angular flange 68 has the usual ledge portion 70 and the usual terminal lip portion 72. Each of the upper sections 106, 107 and 108 is formed around its lower rim with the usual right angular flange 74 (FIG. 20).

At the horizontal juncture between sections, suitable clip means may be employed to interconnect the flanges of the sections in the manner heretofore described. In this instance, each clip means is a clip that is generally designated by numeral 115 in FIG. 20. Each clip 115 has the usual rearward arm 116 and forward arm 118. The forward arm 118 is inclined forward as shown and at its lower end is formed with a loop 120 and a terminal flange 122.

The two arms straddle the lip portion 72 of the angular flange 68 of the lower section of the two sections at the joint and the loop 120 grips the flange 74 of the upper section of the two sections at the joint. Positive engagement with the flange 74 is accomplished by the terminal flange 122 engaging a transverse slot 124 in the flange 74. As shown in the bottom view in FIG. 21 the flange 74 is formed on its underside with a shallow recess 125 which leads to the slot 124 and which is of a depth to accommodate the thickness of the clip material.

Our description in specific detail of the selected embodiments of the invention will suggest various changes, substitutions and other departures from my disclosure within the spirit and scope of the appended claims.

We claim:

1. In a bathroom enclosure for the interior of a building, the combination of:
    a base section having a bottom wall, a back wall and two side walls,
    a plurality of stacked sections extending the enclosure upward from the base section with a plurality of vertically spaced junctures between the successive sections,
    the lower section at each juncture being formed around its upper rim with an angular flange having a ledge portion extending substantially horizontally from the upper rim and having an upright lip portion extending from the ledge portion in horizontally displaced relationship from the rim,
    the upper section at each juncture being formed with a lower flange around its lower rim, the lower flange extending substantially horizontally in substantially the same direction as the ledge portion of the lower section and resting on the ledge portion of the lower section at the juncture between the lower and upper section, and
    resilient means engaging the upright lip portion and the ledge portion of the lower section and the lower flange of the upper section for maintaining the two sections in a fixed relationship to each other, the resilient means including a first portion C-shaped to fit resiliently over the upright lip portion and including a second portion extending resiliently between the ledge portion on the lower section and the lower flange on the upper section and engaging the lower flange on the upper section and including a third portion resiliently engaging the lower flange portion in cooperative relationship with the second portion to retain the lower section and the upper section in fixed relationship.

2. A combination as set forth in claim 1 in which each of said plurality of sections has a flange at its lower edge with spaced recesses therein for engagement by the second portions of the associated resilient means.

3. In a knockdown bathroom enclosure, the combination of:
    a base section having a bottom wall, a back wall and two side walls,
    a plurality of sections for stacking with the base section to form the assembled bath enclosure, each section of said plurality having a back wall and two side walls and being open at its front, bottom and top,
    each of said sections in the plurality and the base section being tapered along the side walls with the width of the section across the front greater than the width of the section across the back to provide for a nesting of the sections for convenience of storage and shipment prior to installation,
    each of the sections having flange portions extending substantially horizontally for engagement with the flange portions of the adjacent section,
    each of the sections in the plurality being disposed vertically in adjacent relationship to other sections in the plurality or to the base section and each being disposed with its flange section in abutting relationship to the flange portions of the adjacent sections, and
    means for resiliently engaging the abutting flange portions of the adjacent sections to maintain the sections in a fixed relationship.

4. A combination as set forth in claim 3 wherein all of the sections are made of a plastic material with the flange portions shaped and dimensioned to receive and support the abutting flange portions of the adjacent section, the lower flange portion of each section having a ledge portion extending substantially horizontally and an upright lip portion extending from the ledge portion in horizontally displaced relationship to the walls of the section.

5. A combination as set forth in claim 4 wherein the resilient means constitute clips for use at the junctures of the sections in the assembled bath enclosure, each clip having a first portion C-shaped to straddle the lip portion of the lower flange portion in the associated section and having a second portion extending between the abutting flange portions of the adjacent sections and having a third portion engaging the flange portion of the upper one of the two adjacent sections and cooperating with the second portion to hold the adjacent sectins in fixed relationship.

6. The combination set forth in claim 5 wherein the second portion of the flange portion has a portion extending into the flange portion of the upper one of the two adjacent sections to cooperate with the third portion in holding the two adjacent sections in fixed relationship.

7. In a knockdown bathroom enclosure, the combination of:
  a base section having a bottom wall, a back wall and two side walls,
  a plurality of sections for stacking with the base section to form the assembled bath enclosure, each section of said plurality having a back wall and two side walls and being open at its front, bottom and top,
  each of the sections of the plurality of sections having a first flange horizontally extended around its upper edge and a second flange horizontally extended around its lower edge with each of the first and second flanges extending around the two sides and back of the section, the flanges being formed and disposed to provide an abutting relationship between the flanges of adjacent sections upon a disposition of the sections in adjacent relationship,
  each of said sections in the plurality and the base section being tapered from front to back with the width of the section across the front greater than the width of the section across the back to provide for a nesting of the sections for convenience of storage and shipment prior to installation, and
  means for resiliently engaging the abutting flange portions of the adjacent sections to hold the adjacent sections in fixed relationship to each other.

8. In a bathroom enclosure for the interior of a building having interior walls with an outer layer, the combination of:
  a base section having a bottom wall, a back wall and two side walls,
  a plurality of stacked sections extending the enclosure upward from the base section with a plurality of horizontal junctures between the successive sections, each of the stacked sections having a back wall and side walls and a top and bottom defined by rims,
  the lower section of the two sections at each juncture being formed around its upper rim with an angular flange having a ledge portion extending substantially horizontally from the side and back walls and an upright lip portion extending upwardly from the ledge portion in horizontally displaced relationship to the side and back walls,
  the upper section of the two sections at each juncture being formed around its lower rim with a lower flange resting on the ledge portion of the lower of the two sections at the juncture in abutting relationship to the ledge portion,
  the upper rim of the uppermost section and the two front edges of all of the sections being formed with angular flanges having ledge portions extending substantially horizontally from the front edges and lip portions extending upwardly from the ledge portions in horizontally displaced relationship to the side and back walls to mate with the outer layer of the interior walls of the building, and
  a plurality of clips spaced apart at each of said junctures, each clip having a first portion resiliently engaging the lip portion of the angular flange of the lower of the two sections at the juncture and having at least a second portion extending between the abutting flanges and resiliently engaging the lower flange of the upper of the two sections at the juncture,
  the lower flange of the upper of the two sections at each juncture being locally offset from the upper flange along at least a portion of its horizontal dimensions to provide clearance for the extension of the clip between the abutting flanges.

9. A combination as set forth in claim 8 wherein all of the sections in the plurality and the base section are tapered from the front toward the back to nest together for shipment.

10. A combination as set forth in claim 8 where the lower flange of the upper section at each of the junctures is formed with a recess in its offset portion for engagement by the second portion of the corresponding clip.

11. In a knockdown bathroom enclosure, the combination of:
  a base section having a front and a back and bottom wall, a back wall and two side walls,
  a plurality of sections for stacking with the base section to form the assembled bath enclosure, each section of said plurality being open at the front, bottom and top, each section of the plurality having a back wall and two side walls,
  each of said sections including the base section being tapered from front to back with the width of the section across the front greater than the width of the section across the back to provide for a nesting of the sections for convenience of storage and shipment prior to installation,
  each of said sections having a layer of plastic incorporating glass fibers and further having a backing layer of a different plastic material for reinforcement,
  each of the sections having horizontal flange portions constructed and disposed for disposition in abutting relationship to each other upon a disposition of the sections in adjacent verical relationship, and
  resilient clip means resiliently engaging the horizontal flange portions for holding the vertically adjacent sections in a fixed relationship.

12. In a bathroom enclosure for the interior of a building, the combination of:
  a base section having a bottom wall, a back wall and two side walls,
  a plurality of stacked sections extending the enclosure upward from the base section with a plurality of vertically spaced junctures between the successive sections,
  the lower section at each juncture being formed around its upper rim with an angular flange having a ledge portion extending substantially horizontally from the section and having an upright lip portion extending substantially vertically from the ledge portion in horizontally displaced relationship to the ledge portion,
  the upper section at each juncture being formed around its lower rim with a lower flange extending substantially horizontally from the section and resting on the ledge portion of the lower of the two sections at the juncture,
  the upper rim of the uppermost section and the two front edges of all of the sections being formed with angular flanges having ledge portions and lip portions to mate with the outer layer of the interior walls of the building,
  a plurality of clips spaced apart at each of said junctures, each clip being C-shaped to resiliently straddle the lip portion of the angular flange of the lower section at the juncture and to resiliently engage the lower flange of the upper section at the juncture, and
  sealant material interposed between the two sections at each of said junctures, said sealant material being permanently resilient and elastic.

13. A combination as set forth in claim 12 in which the bath enclosure is a shower stall and the base section is open at the front.

14. A combination as set forth in claim 12 in which the base section is a bath tub.

(References on following page)

References Cited

UNITED STATES PATENTS

| | | | |
|---|---|---|---|
| 1,574,099 | 2/1926 | Kridler | 52—547 |
| 1,622,983 | 3/1927 | Tracy | 52—584 |
| 2,087,121 | 7/1937 | Samelow | 52—270 |
| 2,317,015 | 4/1943 | Allen | 52—547 |
| 2,983,340 | 5/1961 | Zittle | 52—547 |
| 3,149,187 | 9/1964 | Wood | 52—309 |
| 3,173,229 | 3/1965 | Weber | 52—547 |
| 3,174,256 | 3/1965 | Lockwood | 52—547 |
| 3,182,767 | 5/1965 | Kuehl | 52—593 |
| 3,209,669 | 10/1965 | Bayne | 52—200 |
| 3,214,876 | 11/1965 | Mattes | 52—546 |
| 1,412,912 | 4/1922 | Bain | 220—5 |
| 2,103,280 | 12/1937 | Sherron | 52—264 |

FOREIGN PATENTS 24,770   1895   Great Britain.

OTHER REFERENCES

Scientific American, "Plastics," January 1965, pp. 26, 28.

FRANK L. ABBOTT, *Primary Examiner.*

JAMES L. RIDGILL, *Examiner.*

R. A. STENZEL, *Assistant Examiner.*